United States Patent
Chapman

(10) Patent No.: US 8,507,405 B2
(45) Date of Patent: Aug. 13, 2013

(54) STABLE SUB-MICRON TITANIA SOLS

(75) Inventor: David M. Chapman, Ellicott City, MD (US)

(73) Assignee: Cristal USA, Inc., Hunt Valley, MD (US)

(*) Notice: Subject to any disclaimer, the term of this patent is extended or adjusted under 35 U.S.C. 154(b) by 0 days.

(21) Appl. No.: 13/550,954

(22) Filed: Jul. 17, 2012

(65) Prior Publication Data

US 2012/0283092 A1   Nov. 8, 2012

Related U.S. Application Data

(62) Division of application No. 12/618,484, filed on Nov. 13, 2009, now Pat. No. 8,247,343.

(51) Int. Cl.
| | |
|---|---|
| *B01J 31/02* | (2006.01) |
| *B01J 21/06* | (2006.01) |
| *B01J 23/10* | (2006.01) |
| *B01J 21/08* | (2006.01) |
| *B23B 5/16* | (2006.01) |
| *C01G 23/053* | (2006.01) |
| *C01G 23/08* | (2006.01) |

(52) U.S. Cl.
USPC ........ 502/304; 502/350; 502/439; 502/345; 502/338; 502/164; 423/81; 423/84; 423/610; 423/69

(58) Field of Classification Search
None
See application file for complete search history.

(56) References Cited

U.S. PATENT DOCUMENTS

| | | | |
|---|---|---|---|
| 4,752,340 A | 6/1988 | Brand et al. | |
| 4,904,411 A | 2/1990 | Novich et al. | |
| 5,049,309 A | 9/1991 | Sakamoto et al. | |
| 5,886,069 A | 3/1999 | Bolt | |
| 6,740,312 B2 | 5/2004 | Chopin et al. | |
| 7,431,903 B2 * | 10/2008 | Koyanagi et al. | 423/81 |
| 2009/0062111 A1 | 3/2009 | Fu et al. | |
| 2009/0180976 A1 | 7/2009 | Seeney et al. | |

FOREIGN PATENT DOCUMENTS

| | | |
|---|---|---|
| GB | 2361653 A | 10/2001 |
| WO | WO 2006/010438 | 7/2001 |
| WO | PCT/US2010/051810 | 7/2011 |

OTHER PUBLICATIONS

Heijman, et al. Langmuir 1995, 11,422-427.
Mitra et al. J. Am. Ceram. Soc., 2008,91 [1], 64-70.
SciFinder Search History, 7 pages.

* cited by examiner

*Primary Examiner* — Yun Qian
(74) *Attorney, Agent, or Firm* — Dunlap Codding, P.C.; Tanzina Chowdhury

(57) ABSTRACT

The present invention is directed to compositions and processes for the production of stable, alkaline, high solids, low viscosity, low surface tension, low flammability, sub-micron titania sols that have minimal offensive odor and methods of their use. Compositions of the present invention include, for example, mixtures of strong and weak organic bases used as dispersants to stabilize the titania sols. The dispersant mixtures have been found to result in relatively high titania solids content, low surface tension, low viscosity suspensions that are low in flammability. Sols produced according to the present invention can be used, for example, in catalytic applications such as catalyst supports for diesel emission control, or in pollutant photocatalyst applications in which it is desirable to have the titania in sol form.

8 Claims, 3 Drawing Sheets

STABLE SUB-MICRON TITANIA SOLS

CROSS-REFERENCE TO RELATED APPLICATIONS

The present application is a divisional of U.S. Ser. No. 12/618,484 filed Nov. 13, 2009, now U.S. Pat. 8,247,343. The entire contents of which is hereby expressly incorporated herein by reference.

STATEMENT REGARDING FEDERALLY SPONSORED RESEARCH OR DEVELOPMENT

Not applicable.

BACKGROUND

This invention relates to high-surface area anatase titania alkaline sol compositions useful as catalyst supports and binders, and methods of their manufacture. High surface area, or ultrafine, anatase titania ($TiO_2$) is commonly used as a catalyst support material for reacting with atmospheric pollutants such as oxides of nitrogen, particularly from diesel engine exhaust, via reduction with ammonia or urea, in a process termed selective catalytic reduction (SCR). In this catalytic process, the titania is typically used as the support material for the active catalytic metal or oxide, which is typically vanadia or other active materials such as iron, cerium, copper, and/or manganese oxides. Anatase titania is also active by itself in the light-catalyzed (photocatalysis, PC) destruction of such atmospheric pollutants such as the oxides of nitrogen, sulfur, ozone, toxic and unpleasant odors such as VOCs, and particulate materials such as dust and dirt. The titania can be used alone, or can be mixed with other materials, and disposed as a coating on a surface. The titania coating, when illuminated by UV light, absorbs the UV light thereby driving the photocatalytic process which degrades, reduces, or oxidizes the pollutants. The titania may be provided as a stable, aqueous colloidal dispersion (a sol), that is, a mixture in which the titania particles are small enough to resist sedimentation over time. Examples of ultrafine anatase titania sols include S5-300A® and S5-300B®, which are peptized with acid and base, respectively, and are available from Millennium Chemical Co. Sol S5-300B® for example comprises titania in a weight % of 17.5±2.5, at a pH of 11.5±1, and has a surface area of >250 $m^2/g$ of dried product as measured by BET. In addition to serving as a catalyst material, small particles of anatase titania provided in the stable sol can be used as a binder material in order to improve the adhesion of other titania particles onto a monolith support. Further, the ability to provide titania catalytic materials and support materials in small particle form is particularly advantageous for adding SCR activity to a diesel particulate filter (DPF) by coating the pores in the walls of a wall-flow particulate filter. Such a combined particulate filter/SCR catalyst is termed SCR-F, and this approach offers significant advantages over separate SCR/DPF catalysts.

While S5-300B® titania sol has shown great usefulness as a titania source for use in production of catalytic materials, it has several short comings. S5-300B® has, as noted above, a titania content of about 17.5 wt %. It is desirable to increase the solids content of the sol for several reasons. First, a sol provided at higher solids will have lower freight and duty costs. Second, when used in a production process such as wash-coating a monolith, a higher solids sol will enable more of the titania solids to be deposited in one wash-coating step, which can lead either to improved functionality, lower processing costs, or both. Further, S5-300B® is stabilized at a pH of about 11.5 by the organic dispersant diethylamine (DEA), which is both strongly alkaline and miscible in water, and as such is a good alkaline peptizing agent However, this conventionally-available S5-300B® sol has a relatively high flammability (flashpoint 35° C.) due to the high vapor pressure and low boiling point of diethylamine which constitutes about 2.6 wt % of the sol.

While S5-300B® has the undesirable properties of being provided at relatively low solids content with a high vapor pressure dispersant, it does have the desirable properties of low viscosity and low surface tension. These desirable properties are useful in that they facilitate the ingress of the sol into the channels and/or pores of a monolith support, so that the washcoating process is improved.

It is thus desirable to develop an improved sol, which is provided at higher solids, with a lower vapor pressure, that can be made under relatively mild conditions, while still maintaining the favorable properties of low viscosity and low surface tension.

The peptization route to prepare stable titania sols is disclosed in U.S. Pat. No. 5,049,309, and more recently in US 2009/0062111 A1. In this approach, a precipitated hydrous titania precursor from the sulfate process can be used. The physical structure of this precipitated hydrous titania precursor is described in two references: Sathyamoorthy, S., et al, in *Crystal Growth and Design*, (2001) Vol. 1, No. 2, 123-129, and Jalava, J.-P., in *Industrial & Engineering Chemistry Research*, (2000), Vol. 39, No. 2, 349-361. To briefly summarize, such a precipitated material is comprised of small anatase primary crystallites, typically on the order of a few nm in size. These crystallites are further bonded together to form what are often referred to as primary aggregates which typically range in diameter from 50-100 nm. These primary aggregates are also further bonded together to form agglomerates that are roughly one or two microns (1 µm-2 µm) in diameter. The final agglomerated particle thus has an internal porous network. It is believed that in the peptization process, severe conditions of time, temperature and pH are used to create chemical forces that disrupt the forces that bond the primary aggregates together to form the micron-sized agglomerate. When these latter forces are overcome, the agglomerates are broken down into the primary aggregates roughly 50-100 nm in size. Under more severe peptization conditions, the primary aggregates can then be broken down into the primary crystallites. One object of the present invention is to provide an alternative means of breaking the agglomerates down into smaller particles that can be done under less severe conditions of pH, time and temperature, while enabling sols with higher solids content to be obtained.

For use of the titania sols as active catalyst materials, catalyst supports or catalyst binders, it is disadvantageous to use the hydroxides of Group IA or IIA elements as dispersants or peptizing agents because such alkali (such as NaOH and KOH) are strong catalyst poisons for SCR reactions, for example. Therefore, the alkaline dispersants of the present invention are restricted to organic bases (and hence can be burned off during the production process of the final catalytic article for applications such as SCR). Examples of weak organic bases such as $NH_3$ and the alkanolamines, which have lower flammability and cost than DEA, are not as strongly alkaline as DEA, and hence do not effectively to peptize the titania to prepare a stable sol. An example of a very strong base that has lower flammability than DEA is tetramethylammonium hydroxide (TMAOH). This reagent, by virtue of the fact that it is a salt in aqueous solution, however, produces sols that have relatively high surface tension. Further, TMAOH and its decomposition products (amines) have very strong and offensive odors. Finally, TMAOH is a relatively expensive reagent compared to other organic bases such as the alkanolamines.

A titania sol which optimizes the optimal features of high solids content and stability and minimizes the features of flammability, viscosity and surface tension would be highly desirable.

SUMMARY OF THE INVENTION

The present invention is directed to compositions and processes for the production of stable, alkaline, high solids, low viscosity, low surface tension, low flammability, sub-micron titania sols that have minimal offensive odor and methods of their use. Compositions of the present invention include, for example, mixtures of strong and weak organic bases used as dispersants to stabilize the titania sols. The dispersant mixtures have been found to result in relatively high titania solids content, low surface tension, low viscosity suspensions that are low in flammability.

DETAILED DESCRIPTION OF THE INVENTION

Figure 1:
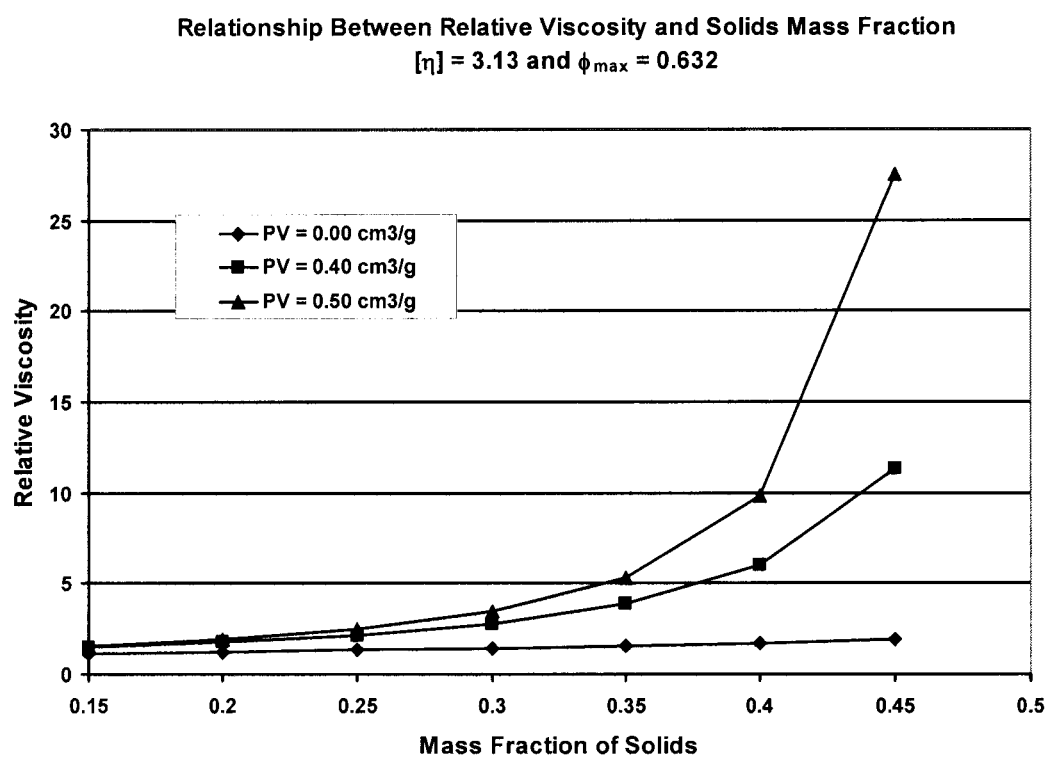
FIG. 1 is a graph comparing viscosities of hypothetical anatase particle suspensions as a function of particle mass fraction, for particles of various pore volumes.

The present invention is directed to compositions and processes for the production of stable, alkaline, high solids, low viscosity, low surface tension, low flammability, sub-micron titania sols that have minimal offensive odor and methods of their use. Compositions of the present invention include, for example, mixtures of strong and weak organic bases used as dispersants to stabilize the titania sols. The dispersant mixtures have been found to result in relatively high titania solids content, low surface tension, low viscosity suspensions that are low in flammability. The process involves media milling of titania precursor materials using small, high density milling media to efficiently produce the ultrafine titania particles under relatively mild conditions of time, temperature and pH. The process is also very flexible in that additional inorganic additives can be included which serve to further modify and enhance the titania surface for improved functionality. For example, when titania is milled in the presence of a form of silica such as a tetra(alkyl)ammonium silicate (e.g., tetramethylammonium silicate), the surfaces of the titania particles are stabilized against sintering, which serves to efficiently maintain the anatase phase of the titania and prevents crystal growth under severe thermal and hydrothermal conditions, even in the presence of vanadia added to the titania for use of the product as a catalyst. This latter improvement is particularly relevant for applications of the titania sols in SCR-F applications where the temperatures can become very high as a result of soot combustion during regeneration of the filter.

Compositions of the present invention are higher in titania solids (e.g., 30 wt % versus the 17.5±2 wt % of S5-300B®), are lower in flammability than conventionally-available S5-300B®, and are provided at low viscosity and low surface tension. A further benefit is that the mixtures have relatively inoffensive odor. In combination with the compositions, the media milling process is a very efficient means of generating very small particle size titania sols. The surface area of the titania recovered from thermally or hydrothermally aged sols can be improved, as noted above, via treatment with a soluble form of silica, and the anatase phase stability can be improved as well, which is desirable for catalyst applications. The catalytic functionality of the titania sols can be further improved by the incorporation of additional inorganic additives such as tungsten trioxide during the wet-milling process.

In these methods, the invention provides for alternative dispersant compositions that enable these high wt % solids, low viscosity, low surface tension, small particle size sols to be easily prepared. Preferred dispersant mixtures comprise a weak organic base (e.g., an alkanolamine) and a strong organic base (e.g., a quaternary alkylammonium hydroxide). In addition, the silica stabilized sols maintain higher surface area and demonstrate better phase stability than sols without the silica stabilization or with alternative forms of silica stabilization. Further, sols with added silica and tungsta are good catalyst supports for vanadia-based SCR catalysts.

Sols produced according to the present invention can be used, for example, in catalytic applications such as catalyst supports for diesel emission control, or in pollutant photocatalyst applications in which it is desirable to have the titania in sol form.

Before describing various embodiments of the invention in detail, it is noteworthy that it is believed that one skilled in the art can, using the description herein, practice the present invention to its fullest extent. The following embodiments and examples describe how to make the various compositions and processes of this invention and are to be construed as merely illustrative, and not limitative of the disclosure in any way whatsoever. Those skilled in the art will promptly recognize appropriate variations from the procedures.

A particular object of the present invention is to produce a high solids (high wt % titania), stable, low flammability, low viscosity, low surface tension, alkaline suspension (sol) of very small particle size, high surface area titania in anatase crystal form. The term "stable" refers to the absence of sedimentation over time as well as to the maintenance of low viscosity over time. That is, unstable sols tend to form unacceptable amounts of sediment over the course of months, or the sols can increase substantially in viscosity, ultimately forming a "gel". Sedimentation is avoided by producing particles of small size Uses of these sols include, but are not limited to, uses as photocatalytics, and diesel emission control catalyst applications, for example. The sols are produced using a process involving media milling that can be carried out in simple fashion at the industrial scale. An additional surface modification step (where present) involves treatment of the titania sol with another inorganic material such as tungsta and/or silica in an active form. A further embodiment involves modification of the titania surface with a source of tungsta, ceria, manganese, copper, vanadia or other active catalyst, catalyst promoter or catalyst stabilizer. The product(s) of this invention have unique properties as described herein.

Titania Starting Materials:

In the present invention, a precipitated, hydrous $TiO_2$ from the sulfate process is typically used as the starting source material for high surface area anatase. As an example, a titania material with the anatase crystal structure was obtained from the MIC plant in Thann, France, which contained a volatile content (weight loss on ignition) of about 16 wt %, contained a residual sulfate content (reported as $SO_3$) of less than about 0.8 wt %, had high surface area (greater than about 250 $m^2/g$), a high pore volume (greater than about 0.25 cm³/g), and a particle size (D50—measured by light scattering) of about 1.5 microns. However, other sources of particulate titania could be used, in particular those having even higher surface area (up to 400 m²/g) and pore volume (up to 0.4 cm³/g), The above material has been neutralized with aqueous ammonia and washed with water to provide a relatively low sulfate product. A particulate titania could be captured from upstream process steps that, for example, have higher volatile content and higher sulfate content. In such event, the sol production process would have to include additional steps to lower the sulfate level, as high sulfate levels are known to destabilize colloidal sols. Preferably very low sulfate titania is used.

Definition of High Solids: A unique feature of the present invention is the ability to readily prepare high solids (more specifically, high volume fraction), low viscosity titania sols, particularly using titania sources that have high porosity. For example, as described in "Principles of Colloid and Surface Chemistry", by Hiemenz and Rajagopalan, p. 168, the Dougherty-Krieger model describes the relative viscosity of an ideal suspension of spherical particles in terms of the fractional occupied volume that the particles exhibit ($\phi$) and two constant terms, the limiting occupied volume ($\phi_{max}$) and the intrinsic viscosity [$\eta$].

$$\eta/\eta_o = [1-(\phi/\phi_{max})]^{-[\eta]*\phi_{max}}$$

In the expression above, $\eta$ is the viscosity of the suspension of particles, and $\eta_o$ is the viscosity of the pure solvent.

For porous particles, there is, in turn, a relationship between $\phi$ and mass fraction of solids (x) that depends on the particle skeletal density, ($\rho_s$, taken as 3.8 g/cc for anatase), the fluid density ($\rho_f$) and the particle pore volume, PV, e.g., as measured by nitrogen porosimetry, $$\Phi = (1/\rho_s + PV)*\rho_f*x/(1-x*(1-\rho_f/\rho_s))$$

Shown in FIG. 1 are curves calculated for representative anatase particles with pore volumes (PV) of 0.00 cm³/g, 0.40 cm³/g and 0.50 cm³/g, respectively, and with typical values assigned to $\phi_{max}$=0.632 and [$\eta$]=3.13.

It can be seen in FIG. 1 that as the slurry solids increases above a mass fraction of 0.40, the viscosity increases steeply for the particles with pore volume, while the viscosity remains very low for the non-porous particles. Further, the higher the particle pore volume, the higher the viscosity at constant mass fraction. The important conclusion from this discussion is that many prior art high solids suspensions of titania, e.g., comprising rutile-phase titania for pigment applications, are from titania particles with little or no pore volume. Thus, it is much more challenging to formulate the highly porous anatase titania particles of the present invention into high solids sols while maintaining low viscosity because of the fluid entrained in the particle pores.

Dispersants:

As noted above, a goal of the present invention is to provide a stable aqueous alkaline sol that has higher solids, and lower flammability than the conventional product S5-300B®, but which maintains or has better properties than that product. The titania source material is formed into a slurry by addition of water, with an alkaline dispersant present. Preferably the dispersant is an organic compound which does not leave a residue, after burning off during subsequent calcination, for applications (like SCR) where residual Na or K ions are strong catalyst poisons. Such residues may also act to suppress the photocatalytic activity of titania when used in PC applications. It is also preferable that the dispersant be miscible with water, so as to prevent separation of the final sol into an aqueous phase and an organic phase. A list of some possible dispersants which can be used in the present invention is given in Table 1, wherein it can be seen that there are a variety of organic compounds that are alkaline, have lower vapor pressures (higher boiling and flash points) than DEA, and that are miscible with water. For example, one general class of materials that is particularly suitable is the alkanolamines, (including, but not limited to, monoethanolamine, diethanolamine, monoisopropanolamine, and aminomethylpropanol). Other examples of alkanolamines that may be used in the present invention include, but are not limited to, triethanolamine, isopropanolamine, diisopropanolamine and triisopropanolamine. Substituted alkanolamines such as alkyl substituted alkanolamines may be used alternatively, examples of which include, but are not limited to, N,N-dimethylethanolamine, N-methyldiethanolamine, N-methylethanolamine and N,N-diethylethanolamine. These are readily available reagents that are used, e.g., in exhaust gas scrubbing applications, and also have found utility as dispersants for titania. Another material noted in Table I is tetramethylammonium hydroxide (TMAOH). TMAOH, however, is not so desirable to use in appreciable quantities as the sole dispersant because it is relatively expensive, and is very malodorous, and can give relatively high surface tension mixtures with water. Other quaternary alkylammonium hydroxides that have similar properties include, but are not limited to, tetraethylammonium hydroxide, tetrapropylammonium hydroxide, etc.

Given in Table 1 (for most dispersant examples) is a measure of the strength of the base, the pKa (the negative logarithm of the acid dissociation constant). The higher the pKa, the stronger the base. Thus, for example, diethylamine is a stronger base than monoethanolamine, which is a stronger base than diethanolamine (pKa 10.8>9.5>8.9). While the above amines are relatively strong bases, the strongest base in Table 1 is TMAOH, because this reagent dissociates nearly completely in water (it is a 1:1 electrolyte), so that the hydroxide concentration is essentially equal to the initial TMAOH concentration.

TABLE 1

Examples of dispersants for suspending titania in aqueous sol.

| Reagent | Abbreviation | Mol. Wt. | Density | Solubility in water | Boiling Point, C. | Flash Point, C. | Acidity, pKa |
|---|---|---|---|---|---|---|---|
| Ammonium hydroxide | NH4OH | 18.0 | 0.90 | miscible | 36 | | 9.3 |
| Diethylamine | DEA | 73.1 | 0.71 | miscible | 55 | −28 | 10.8 |
| Tetramethylamm•hydroxide | TMAOH | 91.1 | 1.00 | miscible | | 100 | |
| Monoethanolamine | MEAOH | 61.1 | 1.01 | complete | 170 | 85 | 9.5 |
| Monomethylethanolamine | MMEAOH | 75.1 | 0.90 | >10 | 158 | 71 | |
| Diethanolamine | DEAOH | 105.1 | 1.09 | miscible | 217 | 169 | 8.9 |
| Triethanolamine | TEAOH | 149.2 | 1.13 | miscible | 360 | 179 | 7.8 |
| Methyldiethanolamine | MDEAOH | 119.1 | 1.04 | complete | 242 | 140 | |
| Dimethylethanolamine | DMEAOH | 89.1 | | | 135 | 41 | 10.3 |

TABLE 1-continued

Examples of dispersants for suspending titania in aqueous sol.

| Reagent | Abbreviation | Mol. Wt. | Density | Solubility in water | Boiling Point, C. | Flash Point, C. | Acidity, pKa |
|---|---|---|---|---|---|---|---|
| Aminomethylpropanol | AMP | 89.1 | 0.94 | | | 77 | 9.8 |
| Monoisopropanolamine | MIPA | 75.1 | 0.96 | complete | 159 | 73 | 9.7 |
| Diisopropanolamine | DIPA | 133.2 | 0.99 | complete | 249 | 135 | 9.1 |
| Triisopropanolamine | TIPA | 191.3 | 0.99 | | 306 | 160 | 8.1 |

EXAMPLES

Characterization and Properties of Various Sols

Example 1

S5-300B

A sample of commercially available prior art titania dispersion S5-300B was obtained from the MIC production facility in Thann, France. This sol (referred to elsewhere herein as E1) was prepared via the peptization method using the strong organic base diethylamine (DEA). The sol was characterized by a variety of means to determine physical properties. Surface tension of the $TiO_2$ slurries was measured with a Kruss K-100 Tensiometer using the Du Nouy ring method, Viscosities were measured using a Brookfield viscometer. Flammability was measured using the Pensky-Martens method. The sample was also analyzed by Transmission Electron Microscopy (TEM). The sample was prepared for TEM analysis by diluting the provided slurry 1,000:1 using a 50:50 mixture of isopropanol and water. The dilute suspension was briefly hand shaken and a carbon coated Cu TEM grid dipped directly into the suspension. The grids were allowed to air dry and then viewed in the TEM at magnifications ranging from 50 to 400,000×. Analysis was performed using a JEOL 2000FX II TEM operated at 200 kV. During the imaging process particular attention was given to characterizing phase size and distribution. Images were collected with a Gatan MultiScan CCD camera and are in jpeg format.

Example 2

SB-X1

A sample of the prior art titania dispersion SB-X1 was obtained from the MIC production facility in Thann, France. This sol was prepared via the peptization method using the strong organic base tetramethylammonium hydroxide (TMAOH). The sol was characterized as above.

Figure 2:
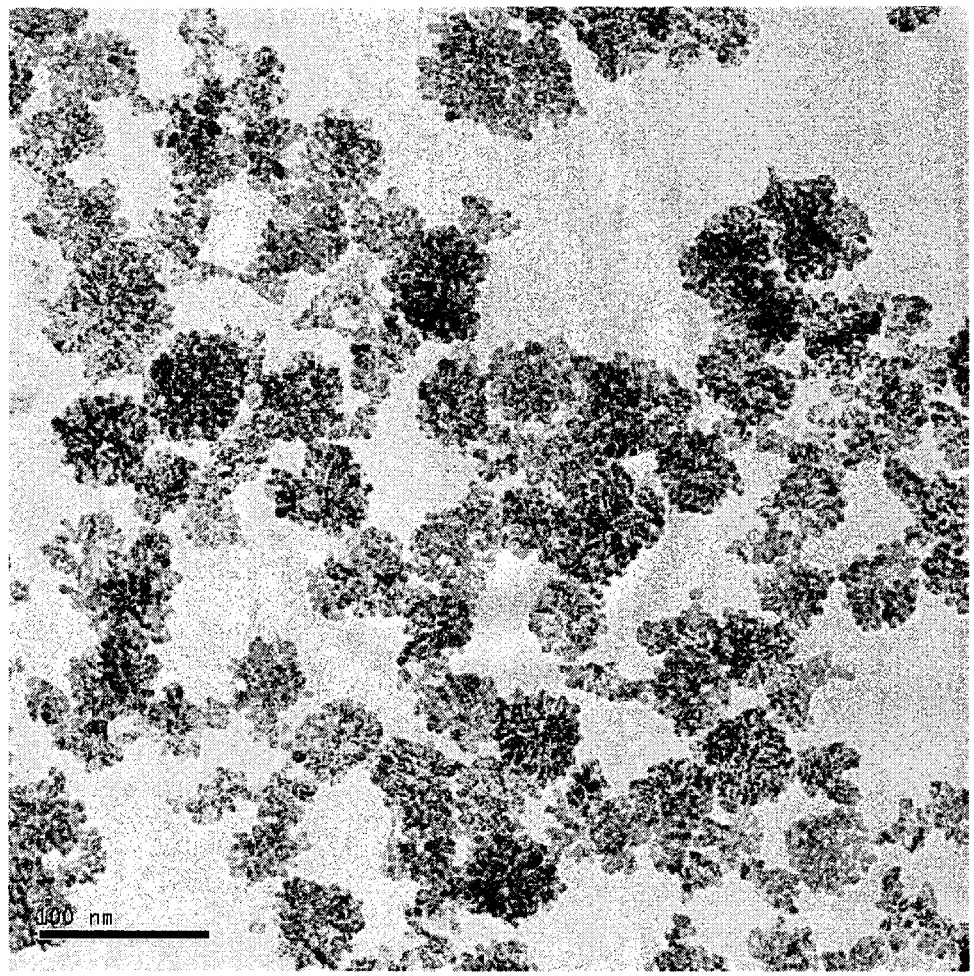
FIG. 2 is a TEM of sol S5-300B®.

It can be seen in Table 2 that the sols S5-300B and SB-X1 of Examples 1 and 2, both of which are made using a single strong organic base by the peptization method, have relatively low titania solids content of only 17.5 wt %. These sols also have low viscosities. They differ, however, in flash point and surface tension. The low flashpoint for S5-300B is undesirable, as is the high surface tension of SB-X1. FIG. 2 reveals that the titania particles in the S5-300B sol consist of primary aggregates that are roughly 50-60 nm in size, and these aggregates consist of the primary anatase crystallites that are roughly a few nanometers in size.

TEM analysis of the SB-X1 sol showed that the titania particles in this case also consist of primary aggregates that are roughly 50-60 nm in size, and these aggregates consist of the primary anatase crystallites that are roughly a few nanometers in size.

Examples 3-9

In the following examples, various sols were prepared using a variety of dispersants, alone or in combination with each other. For these experiments, aqueous dispersions were made up with 30% $TiO_2$ content, and with a constant proportion of total dispersant mass relative to $TiO_2$ of 20 wt % so that the total solids content (titania+dispersant) is about 37.5 wt %, wherein the total amount of dispersant is about 7.5 wt %. The starting titania was obtained from the MIC production facility in Thann, France, and this material was in the anatase crystal form, exhibited a 17% weight loss on ignition at 1000° C., and contained <0.8 wt % $SO_3$. The mean particle size (D50) was 1.2 microns. 100 g or each slurry was prepared, and 75 g of milling media (0.3 mm YTZ media) were added. The particle size reduction of the titania particles was then accomplished by media milling using a Brinkman Retzsch Planetary mill for 1 hr. The products were then characterized by measurement of pH, Brookfield viscosity, and particle size (via Malvern Mastersizer 2000 static light scattering in water). Results are given in Table 3.

TABLE 2

Properties of Prior Art Sols

| Sol | Example | $TiO_2$, wt % | Dispersant | Dispersant wt % | pH | Viscosity (cP) | Surface Tension (mN/m) | Flashpoint, C. |
|---|---|---|---|---|---|---|---|---|
| S5-300B | 1 | 17.5 | DEA | 2.60 | 11.5 | 2.5 | 47 | 38 |
| SB-X1 | 2 | 17.5 | TMAOH | 1.20 | 12.1 | 2.4 | 71 | >100 |

TABLE 3

Properties of various sols prepared via planetary milling.

| Example | Description of Product and/or Dispersant | TiO₂ solids (%) | % Disp Total (w/w TiO₂) | pH | Observations | Microns D50* | D90* | Visc. (cP) |
|---|---|---|---|---|---|---|---|---|
| 1 | S5-300B (DEA) | 17.5 | 15 | 11.8 | Fluid | 0.09 | 0.12 | 2.5 |
| 2 | SB-X1 (TMAOH) | 17.5 | 7 | 12.1 | Fluid | 0.11 | 1.20 | 2.4 |
| 3 | Tetramethylammonium hydroxide (TMAOH) | 30 | 20 | 13.7 | Fluid | 0.10 | 0.18 | 4.6 |
| 4 | Monethanol amine (MEAOH) | 30 | 20 | 10.7 | Thick fluid | 0.11 | 0.21 | 3,299 |
| 5 | Diethanolamine (DEAOH) | 30 | 20 | 9.9 | Thick fluid | 0.12 | 0.23 | 190 |
| 6 | methyldiethanolamine (MDEAOH) | 30 | 20 | 9.7 | Thick fluid | 0.11 | 0.24 | 4,199 |
| 7 | NH4OH | 30 | 20 | | Gelled | 0.72 | 1.29 | |
| 8 | DEAOH + MEAOH (15-5) | 30 | 20 | 10.2 | Thick fluid | 0.12 | 0.23 | 1.200 |
| 9 | DEAOH + NH4OH (18-2) | 30 | 20 | 10.2 | Thick fluid | 0.11 | 0.23 | 1,824 |
| 10 | DEAOH + TMAOH (15-5) | 30 | 20 | 12.4 | Fluid | 0.12 | 0.27 | 4.7 |
| 11 | DEAOH + TMAOH (18-2) | 30 | 20 | 11.0 | Fluid | 0.12 | 0.27 | 3.5 |
| 12 | DEAOH + AMP (15-5) | 30 | 20 | 10.4 | Fluid | 0.11 | 0.26 | 6.8 |
| 13 | MEAOH + TMAOH (18-2) | 30 | 20 | 11.3 | Fluid | 0.11 | 0.26 | 5.1 |
| 14 | DMEAOH + TMAOH (18-2) | 30 | 20 | 10.8 | Fluid | 0.11 | 0.24 | 6.9 |
| 15 | DEAOH + TMAOH (19-1) | 30 | 20 | 10.4 | Fluid | 0.11 | 0.25 | 6.1 |
| 16 | MEAOH + AMP (15-5) | 30 | 20 | 10.7 | Gelled | 0.11 | 0.21 | 1,686 |
| 17 | DEAOH + AMP (18-2) | 30 | 20 | 10.1 | Fluid | 0.11 | 0.25 | 13.3 |
| 18 | DEAOH + AMP + TMAOH (15-4-1) | 30 | 20 | 10.6 | Foamy but fluid | 0.11 | 0.27 | 5.8 |
| 19 | TEAOH + TMAOH (18-2) | 30 | 20 | 10.2 | Fluid | 0.11 | 0.25 | 7.0 |
| 20 | TEAOH + AMP (15-5) | 30 | 20 | 9.9 | Foam | 0.13 | 0.42 | 10.0 |
| 21 | MEAOH + MIPA (15-5) | 30 | 20 | 10.7 | Thick fluid | 0.11 | 0.21 | 2,166 |
| 22 | DEAOH + MIPA (15-5) | 30 | 20 | 10.1 | Slightly Foamy | 0.11 | 0.25 | 80 |

In Examples 3 through 7 each sol contains only a single dispersant. With the exception of the sol of Example 3 (tetramethylammonium hydroxide), it can be observed that the viscosities of the prepared sols are very high, and in one case (E7, ammonium hydroxide) the sol has hardened into a gel that resists flow altogether. In Example 3 (TMAOH), the viscosity is relatively low, but the pH is exceptionally high, and as mentioned above, the surface tension of the SB-X1 sol prepared with only TMAOH is very high. Also, TMAOH is a very expensive and malodorous raw material militating against its general use.

Sols of Examples 8 and 9 were prepared using mixtures of two dispersants (DEAOH/MEAOH in Example 8, and DEAOH and NH₄OH in Example 9). For these mixtures, the total amount of dispersant was kept constant and equal to 20% by weight of the titania, the ratio of the dispersants was varied as shown in parentheses in Table 3. Thus, the sol of Example 8 was formed by mixing diethanolamine and monoethanolamine in the proportions 15 wt % to 5 wt % and a TiO₂ basis. It can be seen in Table 3 that even for these mixed dispersants, the viscosities of the prepared sols are very high.

Examples 10-22

As preferred embodiments of the present invention, particular mixtures of dispersants were used to make sols according to the method given above for Examples 8 and 9. While the total amount of dispersant was kept constant and equal to 20% by weight of the titania, the ratio of the dispersants was varied as shown in parentheses in Table 3. Surprisingly, it can readily be seen in Table 3 that mixtures of TMAOH with the alkanolamines MEAOH, DEAOH, TEAOH and DMEAOH exhibit very low viscosities (Examples 10, 11, 13-15, 19). In these examples, the TMAOH is present in relatively low amounts from 1 wt % to 5 wt % (based on TiO₂). The dramatic effect that this small added amount of TMAOH has on the viscosity when mixed with the alkanolamines is readily seen by comparing the sols of these examples to those (the sols of Examples 4 and 5), where the alkanolamines were present as the only dispersant. It can be seen that the viscosities of the sols made from dispersant mixtures of alkanolamines with TMAOH are comparable to the viscosity of S5-300B® (Example 1), in spite of the much higher solids content (about 30% TiO₂) of the sols of the present invention.

Additional binary and ternary mixtures were also prepared by the method described above, and in particular, the strong bases AMP and MIPA (pKa 9.8 and 9.7, respectively) were substituted for the very strong base TMAOH to form mixtures with the alkanolamines MEAOH, DEAOH AND TEAOH. When AMP is mixed in amounts ranging from 2 to 5 wt % (TiO₂ basis) with DEAOH (Examples 12 and 17), the mixtures have dramatically lower viscosity relative to the sol made with only DEAOH (Example 5). Similarly, when mixed with TEAOH (Example 20) the sol viscosity is relatively low. However, when AMP is mixed with MEAOH (Example 16) the viscosity is high and the mixture forms a gel. Thus, AMP does not have as strong of effect as does TMAOH. Similar observations can be recorded for mixtures of MIPA with the alkanolamines MEAOH (Example 21) and DEAOH (Example 22). In the case of Example 21, the viscosity of the sol is very high, while in the case of Example 22, the viscosity of the sol is intermediate.

Without being bound by theory, some trends can be drawn from the above data. First, when preparing these alkaline, high solids titania sols, when weak bases (pKa <~9.5) are used as the only dispersant at relatively low levels (20 wt % TiO₂ basis), the produced sols tend to have relatively high viscosity. Second, mixtures of the very strong base TMAOH and the relatively weak alkanola mine bases can produce sols of the desired low viscosity.

EXAMPLES

Milling Processes

The present invention also involves the very efficient deagglomeration and deaggregation of the initial titania agglomerate and aggregate particles via milling using very small media in the presence of the novel dispersant combinations. This method of preparation is essential for the present invention because it has been found that the chemical peptization route that is normally used to prepare such sols is not effective with the disperant mixtures described above. In the milling process, the reactants (involving a titania source and the dispersant mixtures) are passed through a media mill (such as the Netzsch Labstar or LMZ-10 mill). After a short residence time in the milling chamber, the titania aggregates and agglomerates in the starting material have become substantially de-aggregated and de-agglomerated, to generate an ultrafine titania stable sol primarily comprising particles having sizes of about 5 nm with trace amounts of primary aggregates with sizes of 30-60 nm and larger agglomerates with sizes of over 100 nm. In the milling process, the mechanical energy imparted by the milling media supplements the chemical energy of the alkaline peptization process, and this enables the high solids sols to be made under relatively mild conditions of time, temperature and pH. Another key feature of this the milling process is that it enables formulation flexibility when it is performed with added titania surface modifiers, including but not limited to, silica, tungsta and alumina. By contrast, such additives typically interfere with the chemical peptization process, and to the extent to which the additives further stabilize the titania surface, it is advantageous to incorporate them during the comminution step. The unique dispersant chemistry is needed to stabilize the small titania particles towards re-aggregation, and to provide for low viscosity, low surface tension sols made under the mild milling conditions.

Example 23

High Solids Sol Preparation via Media-Milling of Titania with Mixed DEAOH/TMAOH Dispersant This example demonstrates the ease by which the novel, high solids sol compositions of the present invention can be prepared via media milling. A slurry composition was prepared by first mixing 6.66 kg of diethanolamine (85% DEAOH) and 2.52 kg tetramethylammonium hydroxide (25% TMAOH) to 44.51 kg water. To this solution was added 30.3 kg of anatase titania (17% loss on ignition, <0.8 wt % $SO_3$) with good mixing. This mixture contained 30 wt % $TiO_2$, 6.75 wt % DEAOH and 0.75 wt % TMAOH. This was milled using the Netzsch LMZ-10 mill with 0.2 to 0.3 mm media. The slurry was re-circulated through the milling chamber for a total elapsed time of 173 min. This material is designated herein as E23. Some properties of the sol of Example 23 are shown in Table 4. It can be seen that the sol has a pH of 10.8 (lower than that for S5-300B and S5-300B2), relatively low viscosity, low surface tension (much lower than that for S5-300B2) and high flashpoint. Also, the sol was essentially odor-less.

TABLE 4

Various Sols Prepared via Media Milling.

| Example | Inorganic oxide | % inorganic oxide | Dis/1 | Wt % Disp. 1 | Disp. 2 | Wt % Disp. 2 | pH | D50, microns | Viscosity (cP) | Surface Tension (mN/m) |
|---|---|---|---|---|---|---|---|---|---|---|
| 23 | $TiO_2$ | 30 | DEAOH | 6.75 | TMAOH | 0.75 | 10.8 | 0.10 | 5.1 | 55 |
| 24 | $TiO_2$ | 35 | MEAOH | 6.30 | TMAOH | 0.80 | 11.2 | 0.12 | 8.5 | 43 |
| 25 | $TiO_2, WO_3$ | 30 | MEAOH | 2.96 | TMAOH | 0.55 | 10.3 | 0.12 | 9.0 | 42 |
| 26 | $TiO_2, SiO_2, WO_3$ | 30 | MEAOH | 2.40 | TMAOH | 0.90 | 10.2 | 0.12 | 4.5 | 46 |
| 27 | $TiO_2$ | 30 | DEAOH | 4.60 | TMAOH | 0.58 | 10.2 | 0.11 | 53.0 | 45 |
| 28 | $TiO_2, SiO_2, WO_3$ | 30 | DEAOH | 2.35 | TMAOH | 1.83 | 11.8 | 0.11 | 4.0 | 36 |

Figure 3:
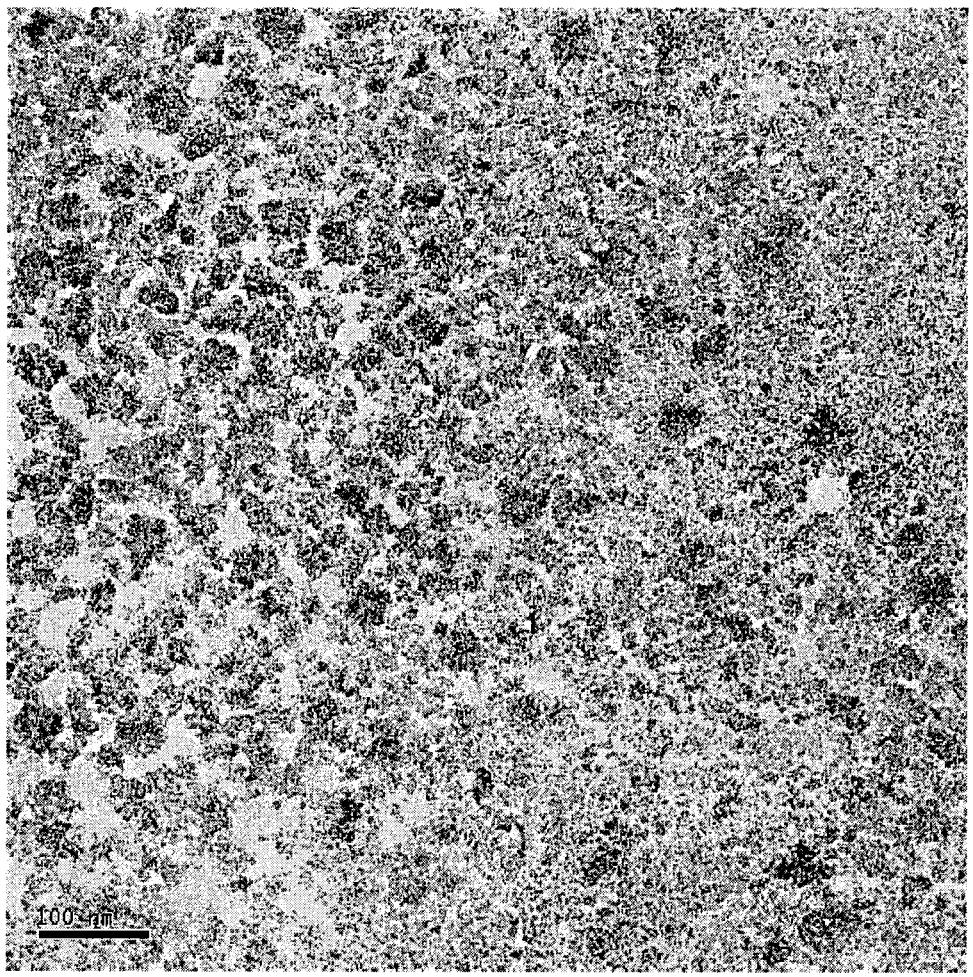
FIG. 3 shows a TEM image of particles of a titania sol (Example 23) of the present invention after media milling as contemplated herein.

In order to evaluate and compare the particle sizes of the novel sol with that for S5-300B, both TEM and x-ray disc centrifuge were used. For the latter method, the sols were each diluted to 3-4 wt % $TiO_2$, and run at 9000 RPM on a Brookhaven Instrument Corporation BI-XDC instrument for a time of 45 min. The results of the x-ray disc centrifuge analysis (calculated on a particle number basis) can be seen in Table 5 below, and exemplary results of the TEM analysis are shown in FIG. 3.

TABLE 5

|  | S5-300B | E23 |
|---|---|---|
| D10, nm | 32 | 18 |
| D16, nm | 34 | 20 |
| D50, nm | 40 | 28 |
| D84, nm | 49 | 40 |
| D90, nm | 53 | 46 |
| Span(D90 − D10)/D50 | 0.51 | 0.97 |

The XDC measurements show that the inventive composition prepared by the milling process has lower median particle size (D50), although the particle size distribution is somewhat broader than that for S5-300B. The TEM image (FIG. 3) indicates that the milled sample is also composed of crystallites with sizes of about 5 nm, however the degree of agglomeration is highly reduced compared to S5-300B (FIG. 2), so that there are many smaller particles in the milled sample (FIG. 3). Levels of agglomeration or aggregation in E23 (FIG. 3) range from near zero, with a significant amount of the sample composed of free (non-agglomerated) crystallites, to a small portion of "standard" agglomeration with crystallite aggregation/agglomeration similar to the standard sample.

The results show that the media-milled mixed dispersant sol of the present invention, comprises significantly smaller particles than a prior art titania sol product (e.g., S5-300B®) produced via the chemical peptization route. Combined with the novel weak base/strong base dispersant mixtures described above (e.g., Examples 10-22), use of the milling process described herein surprisingly results in titania sols having higher titania content, low viscosities, low surface tension and low flammability.

Examples 25, 26, 28

Surface Modification of the Titania During Sol Preparation

In catalytic applications of titania, it is desirable to minimize particle size, maximize the surface area of the titania support, and to maintain the titania primarily in the anatase crystal form. Further, it is desired to incorporate various modifiers and stabilizers in order to enhance catalytic activity. As an example, commercially available titania-based catalysts for SCR applications contain added vanadia (the catalytically active oxide) as well as tungsta and optionally silica. The tungsta is a modifier/promoter in that it moderates the activity of vanadia (e.g., it suppresses the tendency of vanadia to oxidize $SO_2$). Silica is optionally present on the surface to improve the thermal stability of the catalyst.

Alkaline, low viscosity silica-surface treated sols of the invention were prepared by media milling in the presence of a soluble form of silica, comprising tetramethylammonium silicate and/or tungsta as shown in Table 4.

For Example 26, a sol (E26) with the composition (inorganic oxide basis) of 90% $TiO_2$, 4% $SiO_2$ and 6% $WO_3$ was prepared in the following way. A slurry composition was prepared by first mixing 49 g of monoethanolamine (85% MEAOH) and 233 g tetramethylammonium silicate (9% $SiO_2$), 36 g of ammonium paratungstate (APT, 88% $WO_3$) and 864 g water. To this solution was added 569 g of anatase titania (17% loss on ignition, <0.8 wt % $SO_3$) with good mixing. This mixture contained 30 wt % total inorganic oxides. This was milled using the Netzsch Labstar 0.5-L mill with 0.2 to 0.3 mm YTZ media. The slurry was re-circulated through the milling chamber at a flow rate of 0.56 L/min. for a total elapsed time of 30 min. Sols in Examples 25 and 28 (E25 and E28, respectively) were prepared in an similar fashion, but have different final compositions. It can be seen from the data in Table 4 that the sols produced with the above compositions and via the media milling process have small particle size, low viscosity, and low surface tension. Such sols are useful in the ways contemplated herein such as in catalytic applications such as SCR.

Example 29

Example 29 is directed towards demonstrating the catalytic benefit achieved by incorporating the silica and tungsta modifiers during the production of the sol. A comparison $TiO_2$—$SiO_2$—$WO_3$ material with the same composition as for Example 26 (90% $TiO_2$, 4% $SiO_2$ and 6% $WO_3$) was prepared, only in this case the $WO_3$ and $SiO_2$ (in the form of Ludox colloidal silica) were added after the $TiO_2$ sol had been prepared. Thus, to 100 g of the sol of Example 10 was added 2.27 g APT (88% $WO_3$) and 4.4 g Ludox AS-30 (30% $SiO_2$) with stirring. This material is designated E29.

The sols E1, E26 and E29 were evaluated as catalyst supports for vanadia-based catalysts in the following way. In each case, 0.31 g vanadia was added to an appropriate amount of sol (e.g, 50 g of 30 wt % sol) to give a constant loading of 2 wt % $V_2O_5$, and the mixture was then dried under vacuum at 75° C. using a roto-evaporator. The vanadia-loaded materials were then aged at high temperature in hydrothermal environment (750° C. for 16 hr in 10% $H_2O$) in order to simulate accelerated aging in real use, for, e.g., as SCR catalysts for mobile diesel emission engine application. The aged catalysts were then evaluated for their ability to convert NO into $N_2$ (DeNOx) by using a 0.1 g sample of each vanadia-loaded catalyst sample. The catalyst was pelletized and meshed to −20/+40 mesh, and was loaded into a reactor to determine the conversion of NO in the presence of $NH_3$. A flowing stream that contained 5% $O_2$, 500 ppm $NH_3$, 500 ppm NO, and 5% $H_2O$ was passed over the catalyst at a space velocity of 650 l/g·cat-hr. the results for the NO conversion, reported at three different reaction temperatures, are given in Table 6, below.

TABLE 6

DeNOx test results for various catalysts.

| | NO Conversion | | |
|---------|---------------|---------------|---------------|
| Example | T = 250° C. | T = 350° C. | T = 450° C. |
| E26 | 12.9 | 42.9 | 43.7 |
| E29 | 3.6 | 12.6 | 10.9 |
| E1 | 3.8 | 14.7 | 13.0 |

The results show that the E26 catalyst material is much more active than the comparable composition, E29, made by post-addition of $WO_3$ and $SiO_2$ oxides or than a composition derived from the sol of E1.

Therefore, in a preferred embodiment of the present invention, more than one type of dispersant can be mixed in the appropriate proportions to achieve the novel lower flammability alkaline sols of the present invention. Thus, in one embodiment a small amount of the expensive and malodorous TMAOH can be used in mixture with a larger amount of an alkanolamine, such as diethanolamine, to achieve a stable, high pH sol.

Unexpectedly, we have now found that particular mixtures of some of the dispersants disclosed herein have very low viscosity and surface tension, even when used to prepare the high solids titania sols of the present invention.

In one embodiment, the choice of dispersants used in the mixture can be guided by the amine $pK_a$, from which the basicity of the amine can be established, and the sol pH. For example, an amine that is a relatively weak base ($pK_a$<10.5) can be used as the primary dispersant component, while an amine that is a relatively strong base ($pK_a$>10.5) can be used as a secondary dispersant component.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, compositions of matter, means, methods and steps described in the specification. As one of ordinary skill in the art will readily appreciate from the disclosure of the present invention, processes, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, compositions of matter, means, methods, or steps.

Each of the references, patents or publications cited herein is expressly incorporated by reference in its entirety.

What is claimed is:

1. A method of producing an aqueous ultrafine titania sol having (1) a pH >10, (2) a solids component having at least 50% by weight of anatase crystal form of $TiO_2$ particles and less than 50% by weight of at least one inorganic oxide other than $TiO_2$, and (3) an aqueous component comprising a mixture of a weak base having a pKa <10.5 and a strong base having a pKa >10.5, wherein the anatase crystal form of $TiO_2$ particles are present in the aqueous titania sol at a mass fraction >0.25 and/or a volume fraction >0.25, comprising the step of processing the aqueous ultrafine titania sol via media milling until the anatase crystal form of $TiO_2$ particles therein have a particle size <1 μm.

2. The method of claim 1, wherein at least one inorganic oxide other than $TiO_2$ is selected from the group consisting of oxides of silica, tungsta, alumina, ceria, copper, iron, manganese, vanadia, and combinations thereof.

3. The method of claim 1, wherein the anatase crystal form of $TiO_2$ particles have a surface area in excess of 50 $m^2/g$ and a pore volume in excess of 0.10 $cm^3/g$.

4. The method of claim 1, wherein the weak base is an alkanolamine.

5. The method of claim 1, wherein the strong base is a quaternary alkylammonium hydroxide.

6. The method of claim 1, wherein the aqueous ultrafine titania sol has a viscosity <100 cp.

7. The method of claim 1, wherein the aqueous ultrafine titania sol has a surface tension <70 mN/m.

8. The method of claim 1, wherein the aqueous ultrafine titania sol has a flashpoint >100° C.

* * * * *